(12) United States Patent
Rong et al.

(10) Patent No.: US 10,103,852 B2
(45) Date of Patent: Oct. 16, 2018

(54) SYSTEM AND METHOD FOR UPLINK OFDMA TRANSMISSION

(71) Applicant: Futurewei Technologies, Inc., Plano, TX (US)

(72) Inventors: Zhigang Rong, San Diego, CA (US); Young Hoon Kwon, San Diego, CA (US); Yunsong Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 75 days.

(21) Appl. No.: 14/595,944

(22) Filed: Jan. 13, 2015

(65) Prior Publication Data

US 2015/0201432 A1   Jul. 16, 2015

Related U.S. Application Data

(60) Provisional application No. 61/927,762, filed on Jan. 15, 2014.

(51) Int. Cl.
| | | |
|---|---|---|
| H04W 4/00 | (2018.01) | |
| H04L 5/00 | (2006.01) | |
| H04W 72/04 | (2009.01) | |

(52) U.S. Cl.
CPC .......... H04L 5/0007 (2013.01); H04L 5/0053 (2013.01); H04L 5/0082 (2013.01); H04W 72/04 (2013.01); H04L 5/0048 (2013.01)

(58) Field of Classification Search
None
See application file for complete search history.

(56) References Cited

U.S. PATENT DOCUMENTS 8,149,811 B2 * 4/2012 Nabar .................. H04B 7/2618
370/343
8,472,383 B1 * 6/2013 Banerjea .............. H04B 7/0697
370/328
(Continued)

FOREIGN PATENT DOCUMENTS

JP      2012235453 A    11/2012
JP      2013522968 A     6/2013
(Continued)

OTHER PUBLICATIONS

U.S. Appl. No. 61/871,269; Merlin; "Methods and Apparatus for Multiple User Uplink".*
(Continued)

*Primary Examiner* — Kwang B Yao
*Assistant Examiner* — Juvena Loo
(74) *Attorney, Agent, or Firm* — Jinghua Karen Tang

(57) ABSTRACT

Embodiments are provided for implementing efficient uplink (UL) orthogonal frequency division-multiple access (OFDMA) transmission in wireless systems, such as in WiFi networks. An embodiment method includes sending, by an access point (AP) to a plurality of stations (STAs), scheduling information for periodic UL transmission, and sending, to the STAs, a short synchronous signal (SSS) in accordance with the scheduling information for periodic UL transmission. The method further includes receiving, from the STAs, a corresponding UL transmission in response to receiving the SSS. The UL transmission is sent by each of the plurality of the STAs at about a same time. The STAs wait for a time short interframe space (SIFS) after receiving the SSS, before sending, to the AP, the UL transmission.

20 Claims, 4 Drawing Sheets

(56) References Cited

U.S. PATENT DOCUMENTS

| | | | |
|---|---|---|---|
| 8,886,755 B1* | 11/2014 | Liu | H04W 74/04 370/295 |
| 9,237,538 B1* | 1/2016 | Zhang | H04W 56/0005 |
| 2006/0035643 A1* | 2/2006 | Vook | H04L 5/0094 455/450 |
| 2008/0253326 A1 | 10/2008 | Damnjanovic | |
| 2010/0284312 A1 | 11/2010 | Sampath et al. | |
| 2010/0329236 A1* | 12/2010 | Sampath | H04W 56/0035 370/350 |
| 2011/0103280 A1* | 5/2011 | Liu | H04W 52/0229 370/311 |
| 2011/0141892 A1* | 6/2011 | Gong | H04W 4/08 370/235 |
| 2011/0149731 A1* | 6/2011 | Gong | H04W 4/08 370/235 |
| 2011/0176472 A1 | 7/2011 | Amini et al. | |
| 2011/0222458 A1* | 9/2011 | Wu | H04W 72/121 370/312 |
| 2011/0268054 A1* | 11/2011 | Abraham | H04W 74/06 370/329 |
| 2012/0281545 A1 | 11/2012 | Fujiwara et al. | |
| 2013/0170427 A1* | 7/2013 | Gong | H04B 7/0408 370/312 |
| 2013/0286959 A1* | 10/2013 | Lou | H04W 72/04 370/329 |
| 2013/0301551 A1* | 11/2013 | Ghosh | H04W 72/042 370/329 |
| 2014/0119288 A1* | 5/2014 | Zhu | H04W 74/0816 370/329 |
| 2014/0269544 A1* | 9/2014 | Zhu | H04L 1/1671 370/329 |
| 2015/0063257 A1* | 3/2015 | Merlin | H04L 47/12 370/329 |
| 2015/0063258 A1* | 3/2015 | Merlin | H04L 47/12 370/329 |
| 2015/0063318 A1* | 3/2015 | Merlin | H04L 47/12 370/336 |
| 2015/0071051 A1* | 3/2015 | Zhu | H04W 72/121 370/216 |
| 2015/0117368 A1* | 4/2015 | Barriac | H04W 72/02 370/329 |
| 2015/0146654 A1* | 5/2015 | Chu | H04W 72/1289 370/329 |
| 2015/0359000 A1* | 12/2015 | Li | H04W 74/06 370/329 |
| 2016/0227569 A1 | 8/2016 | Wang et al. | |

FOREIGN PATENT DOCUMENTS

| | | |
|---|---|---|
| JP | 2015511077 A | 4/2015 |
| JP | 2015522974 A | 8/2015 |
| WO | 2013130793 A1 | 9/2013 |
| WO | WO 2013/130793 A1 * | 9/2013 |
| WO | 2013169389 A1 | 11/2013 |

OTHER PUBLICATIONS

U.S. Appl. No. 61/909,024; Chu, "UL MU MIMO MAC Consideration".*
"Notification of Transmittal of the International Search Report and the Written Opinion of the International Searching Authority, or the Declaration," Applicant: Huawei Technologies Co., Ltd., PCT/US15/11228, International filing date Jan. 13, 2015; dated Apr. 10, 2015, 7 pages.
Cariou et al., "High-efficiency WLAN," IEEE 802.11-13/0331r5, Mar. 19, 2013, 21 pages.
Cariou et al., "High-efficiency WLAN Straw Poll," IEEE 802.11-13/0339r10, Mar. 19, 2013, 7 pages.
Interdigital Communications Corporation, "Periodic Scheduling of Uplink Resources or LTE VoIP", 3GPP DRAFT; R2-063183, 3rd Generation Partnership Project (3GPP), Mobile Competence Centre, RAN WG2, Riga, Latvia; Nov. 1, 2006, XP050132684. 6 pages.
Supplementary European Search Report for EP 15737158, dated Nov. 30, 2016. 11 pages.

* cited by examiner

SYSTEM AND METHOD FOR UPLINK OFDMA TRANSMISSION

This application claims the benefit of U.S. Provisional Application No. 61/927,762 filed on Jan. 15, 2014 by Zhigang Rong, et al. and entitled "System and Method for Uplink OFDMA Transmission," which is hereby incorporated herein by reference as if reproduced in its entirety.

TECHNICAL FIELD

The present invention relates to wireless and WiFi communications, and, in particular embodiments, to a system and method for uplink orthogonal frequency division-multiple access (OFDMA) transmission.

BACKGROUND

As the number of user devices or stations (STAs) with WiFi connection capability (e.g., smartphones/tablet computers) keeps on increasing, the density of access points (APs) as well as STAs is getting higher, such as instance in growing urban areas. Since the original design for WiFi systems assumes a low density of APs and STAs, the high density of APs and STAs can make the WiFi system less efficient. For example, the current enhanced distributed channel access (EDCA)-based media access control (MAC) scheme for wireless communications may not work efficiently in an environment with a high density of APs and STAs. Therefore, there is a need for a scheme to improve wireless system performance, such as in high density WiFi environments.

SUMMARY OF THE INVENTION

In accordance with an embodiment, a method for uplink (UL) orthogonal frequency division-multiple access (OFDMA) transmission includes sending, by an access point (AP) to a plurality of stations (STAs), scheduling information for periodic UL transmission, and sending, to the STAs, a short synchronous signal (SSS) in accordance with the scheduling information for periodic UL transmission. The method further includes receiving, from the STAs, a corresponding UL transmission in response to receiving the SSS. The UL transmission is sent by each of the plurality of the STAs at about a same time.

In accordance with another embodiment, an AP supporting UL OFDMA transmission comprises at least one processor and a non-transitory computer readable storage medium storing programming for execution by the at least one processor. The programming includes instructions to send to a plurality of STAs, scheduling information for periodic UL transmission, and send, to the STAs, a SSS in accordance with the scheduling information for periodic UL transmission. The programming includes further instructions to receive, from the STAs, a corresponding UL transmission in response to receiving the SSS, wherein the UL transmission is sent by each of the plurality of the STAs at about a same time.

In accordance with another embodiment, a method for UL OFDMA transmission includes receiving, by a STA from an AP, scheduling information for periodic UL transmission, and receiving, from the AP, a SSS in accordance with the scheduling information for periodic UL transmission. The method further includes waiting for a time short interframe space (SIFS), and sending, to the AP, an UL transmission in response to receiving the SSS.

In accordance with yet another embodiment, a STA supporting UL OFDMA transmission, the STA comprises at least one processor and a non-transitory computer readable storage medium storing programming for execution by the at least one processor. The programming including instructions to receive, from an AP, scheduling information for periodic UL transmission, and receive, from the AP, a SSS in accordance with the scheduling information for periodic UL transmission. The programming includes further instructions to wait for a SIFS, and send, to the AP, an UL transmission in response to receiving the SSS.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
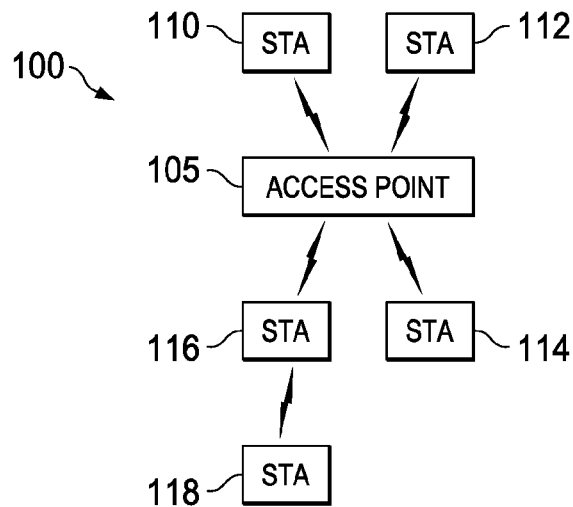
FIG. 1 illustrates an example wireless communications system in accordance with an embodiment of the disclosure.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In cellular systems (e.g., Long Term Evolution (LTE)), orthogonal frequency division-multiple access (OFDMA) has been demonstrated to provide robust performance in a high density environment. The OFDMA scheme can support multiple users simultaneously by carrying different users' traffic on different portions of the system bandwidth. The OFDMA scheme can support a large number of users more efficiently, such as when the data traffic from each individual user is low. OFDMA also avoids wasting frequency resources if the traffic from one user cannot fill out the whole system bandwidth. This becomes even more useful as the system bandwidth becomes wider.

For example, OFDMA can be used on uplink (UL) transmission, also referred to herein as UL-OFDMA, to support voice over Internet protocol (VoIP) service. In this case, the traffic from each user is typically low, and has a periodic pattern, e.g., one packet every 20 millisecond (ms). To transmit the VoIP packets, the resource is scheduled periodically (e.g., once every 20 ms). This can introduce some overhead caused by the periodic scheduling of messages. Alternatively, the periodic resource can be scheduled and reserved at the beginning of the communication, and therefore no more periodic scheduling messages are needed in middle of communications, resulting in less overhead. In LTE, the system is synchronous, with the eNB and all the UEs in the system following the same clock. A periodic resource can be allocated in a semi-persistent way, with scheduling occurring once at the beginning of the communication. This saves overhead by reducing the scheduling messages. Using UL-OFDMA is suitable since the system is synchronous and the requirements for timing accuracy are sufficiently stringent.

However, using the OFDMA scheme in WiFi Systems is more challenging due to lack of synchronization between different STAs on uplink. Due to the loose requirement on timing accuracy in the WiFi system, multiple STAs' time clocks may drift and loose synchronization amongst each other as the communication continues. Because UL-OFDMA transmission requires the transmitted signals of multiple STAs to arrive at the receiver at the same time, losing synchronization can cause a failure of UL-OFDMA.

System and method embodiments are provided herein for implementing efficient uplink OFDMA transmission in wireless systems. The embodiments can be used in wireless communications systems with high density environments, such as in WiFi systems comprising relatively large numbers of STAs and or APs. Specifically, the AP is configured to send or broadcast scheduling information for periodic UL STA transmission. The STAs use this information to synchronize their wakeup time with the periodic UL transmission windows. At each scheduled periodic interval, the AP sends a short synchronous signal (SSS) to each or a group of STAs scheduled for UL at that interval. Upon receiving the SSS, the STAs in the group start their UL transmissions after a time short interframe space (SIFS). For example, the SIFS can be any predetermined suitable wait time and/or according to WiFi or other communications standards. Thus, each group of STAs can be synchronized to begin UL transmissions at corresponding scheduled periodic time intervals, which reduces congestion on UL resource (e.g., UL dedicated bandwidth).

FIG. 1 shows an example of a wireless communications system 100 which can implement the UL-OFDMA transmission embodiments herein. The wireless communications system 100 includes an access point (AP) 105 that serves one or more STAs, such as stations (STA) 110 to 116. An AP 105 can be any network device capable of wireless communications with the STAs and allowing the STAs to access a network, such as the Internet. The AP 105 receives communications originating from the STAs 110-116 and then forwards the communications to their intended destinations, and/or receives (from one or more networks) communications destined to the STAs 110-116 and then forwards the communications to the intended STAs. The STAs 110-116 can be any user communications device with wireless communications capability, such as a smartphone, a tablet computer, a sensor device (e.g., a smart watch), or other devices. In addition to communicating through AP 105, some STAs may directly communicate with one another. For example, STA 116 may transmit directly to STA 118. Although FIG. 1 shows only one AP 105, the system can include any number of APs. In an embodiment, the wireless communications system 100 is a WiFi system where the APs and STAs communicate using WiFi signals and connections. In other embodiments, the AP may be referred to as a base station, an evolved NodeB (eNB), a Femtocell or Picocell, a communications controller, and the like. The STAs may also be referred to as mobile stations, mobiles, user equipment (UE), terminals, users, subscribers, and the like.

The UL-OFDMA transmission scheme includes sending, from the STA 105, scheduling information about the periodic resource allocations to one or more groups of STAs. The scheduling information indicates the periodic scheduling of the transmission of short synchronous signals (SSS) from the AP to the designated STAs. Each group of STAs may be allocated a different periodic timing. This information allows the designated STAs of each group to wake up and receive the SSS at the scheduled timing for that group. Thus, the reception of the SSS becomes synchronized for the STA members of each group, and the STAs of different groups receive the SSS at different timing. The AP then periodically sends the SSS as indicated in the scheduling information. For example, the AP can send the SSS approximately once every 20 ms. Depending on the idle/not idle status of the channel, the timing of the SSS can also be varied around the scheduled periodic timing, e.g., around the 20 ms period. To save overhead, the SSS may only occupy a substantially small number of OFDM symbols (e.g., one symbol). On the frequency dimension, the SSS can be transmitted on the corresponding UL resource of multiple STAs to enable simple STA implementation. The SSS can also be in the form of a determined designed sequence. After receiving the scheduling information, the STA knows the periodic timing and frequency resource used for the SSS, and accordingly wakes up and listens to the SSS in the window around the periodic timing. When the STA detects the SSS, the STA starts transmitting its UL traffic on the periodic scheduled resource after waiting a time short interframe space (SIFS) from the end of the received SSS. This wait time reduces the collisions between the system's STAs on accessing the medium (resource).

Figure 2:
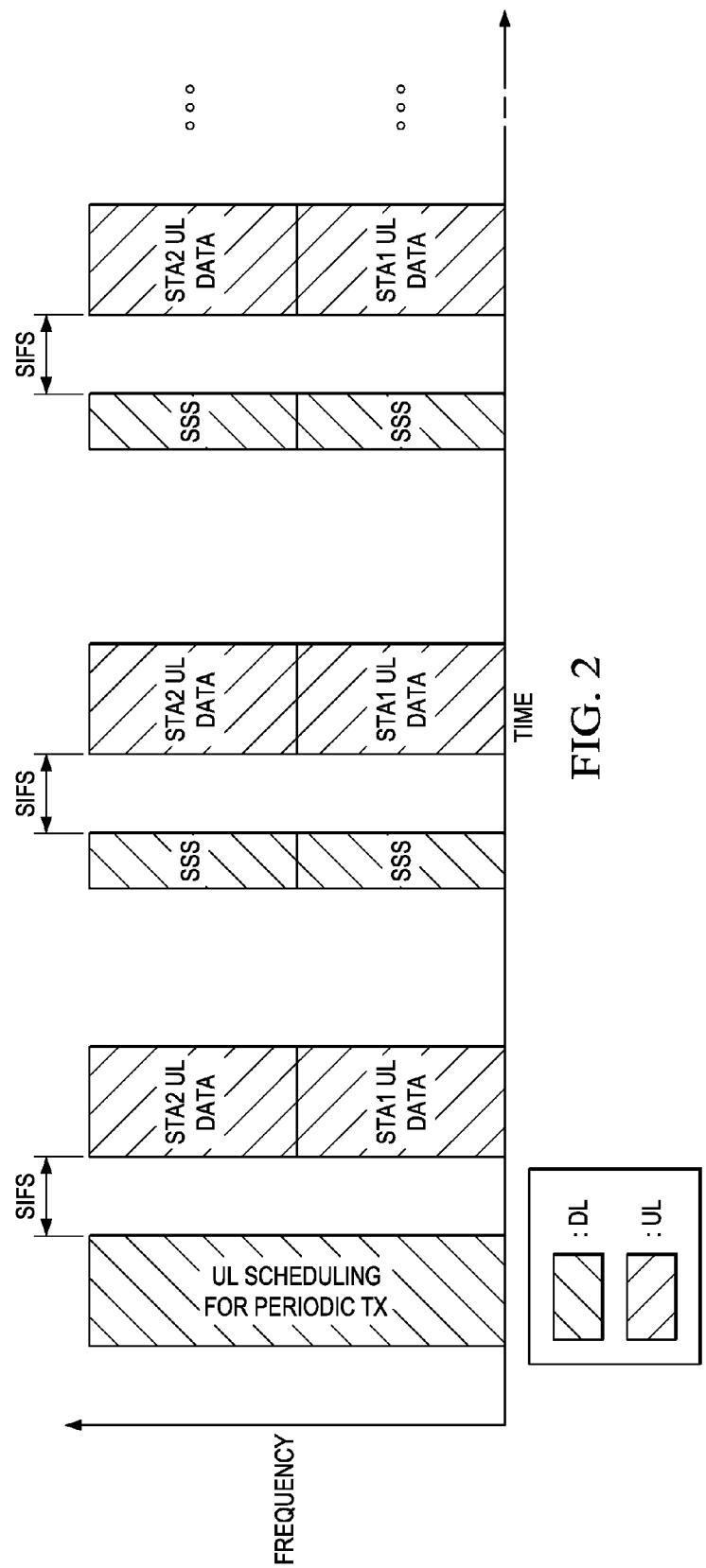
FIG. 2 illustrates an embodiment timing scheme for short synchronous signals (SSS) and uplink (UL) data.

FIG. 2 illustrates an embodiment timing scheme for the SSS and UL data, in accordance with the UL-OFDMA scheme. With this approach, multiple STAs' timing can be synchronized after receiving the SSS. This enables the transmitted signal of multiple STAs to arrive at the receivers at the same time, thus supporting UL-OFDMA. The overhead for sending the SSS is minimized by limiting SSS transmission to a substantially small number of OFDM symbols, e.g., one, or in alternative embodiments, two, three or four. In FIG. 2, the periodic SSS and UL data are shown for a single group of STAs, including (STA1 and STA2). However, multiple groups can have similar periodic SSS and UL data transmissions at non-overlapping timing between the different groups.

Figure 3:
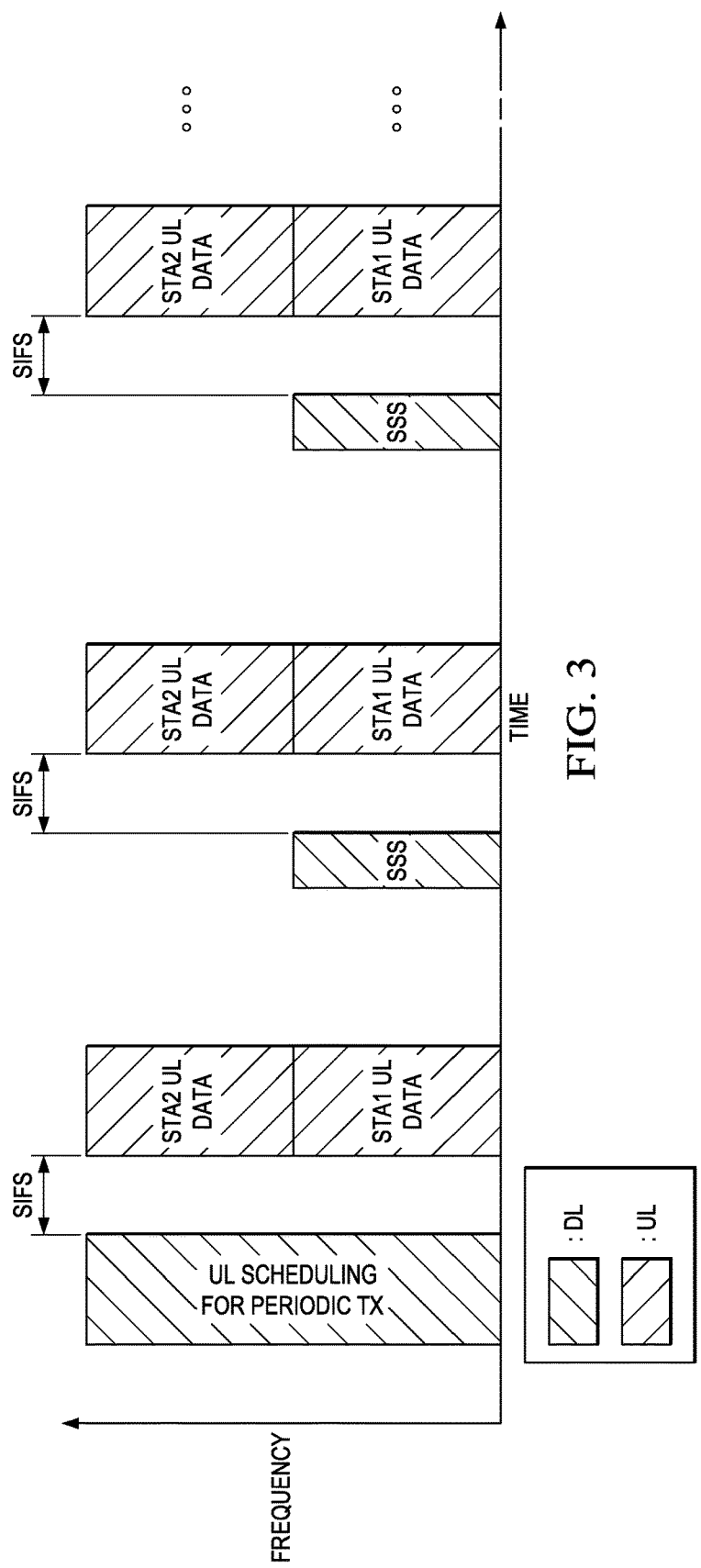
FIG. 3 illustrates another embodiment timing scheme for SSS and UL data.

In the embodiment above, the SSS is transmitted on multiple resource units for the STAs in the group. In another embodiment, to further reduce the overhead of SSS, the SSS can be transmitted on only one resource unit (e.g., one 20 MHz channel) for all the STAs in the same group. In this embodiment, the AP notifies STAs about the frequency location of the SSS in the scheduling information on the periodic resource allocations. This generally may require a more complicated STA implementation than the embodiment above because some of the STAs need to switch from one channel to another to detect the SSS. For example, as illustrated in FIG. 3, the SSS is only transmitted on the channel corresponding to the UL transmission for STA1. Further, in any of the embodiments above, the SSS can carry power control information for the corresponding STAs. The power control information can be used by the STAs to adjust their UL transmission power, thus avoiding the near-far problem in UL-OFDMA.

The embodiments above enable the use of periodic OFDMA on the UL with relatively small control overhead, thus making resource usage more efficient. The schemes are beneficial when supporting services such as VoIP in a high density environment. The embodiments may be implemented in smartphones, tablets, WiFi APs, wireless routers, and other consumer electronics.

Figure 4:
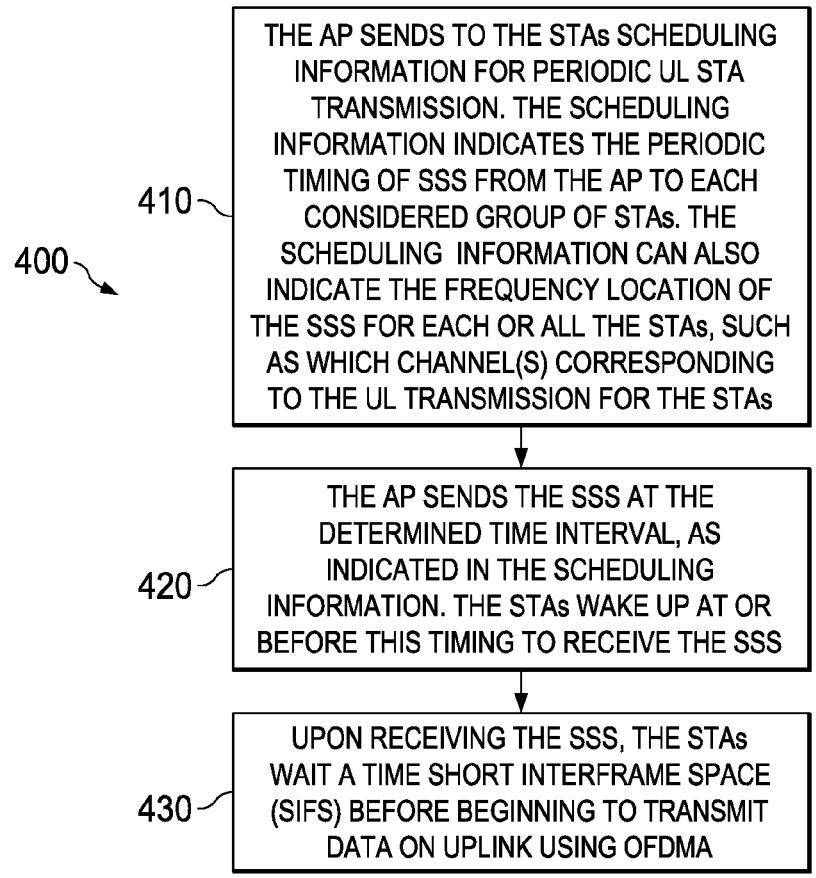
FIG. 4 illustrates an embodiment method for UL OFDMA transmission.

FIG. 4 illustrates an embodiment method 400 for uplink OFDMA transmission for wireless communications. For instance, the method 400 can be implemented in a WiFi system between an AP and a plurality of STAs. At step 410, the AP sends (broadcasts or unicast) to the STAs scheduling information for periodic UL STA transmission. The scheduling information indicates the periodic timing of SSS from the AP to each considered group of STAs. The periodic timing is determined by a selected interval, such as every 20 ms. The scheduling information can also indicate the frequency location of the SSS for each or all the STAs in a group, such as which channel(s) corresponding to the UL transmission for the STAs. At step 420, the AP sends the SSS at the determined time interval, as indicated in the scheduling information. The STAs wake up at or before this timing to receive the SSS. At step 430, upon receiving the SSS, the STAs wait a time short interframe space (SIFS) before beginning to transmit data on uplink using OFDMA.

Figure 5:
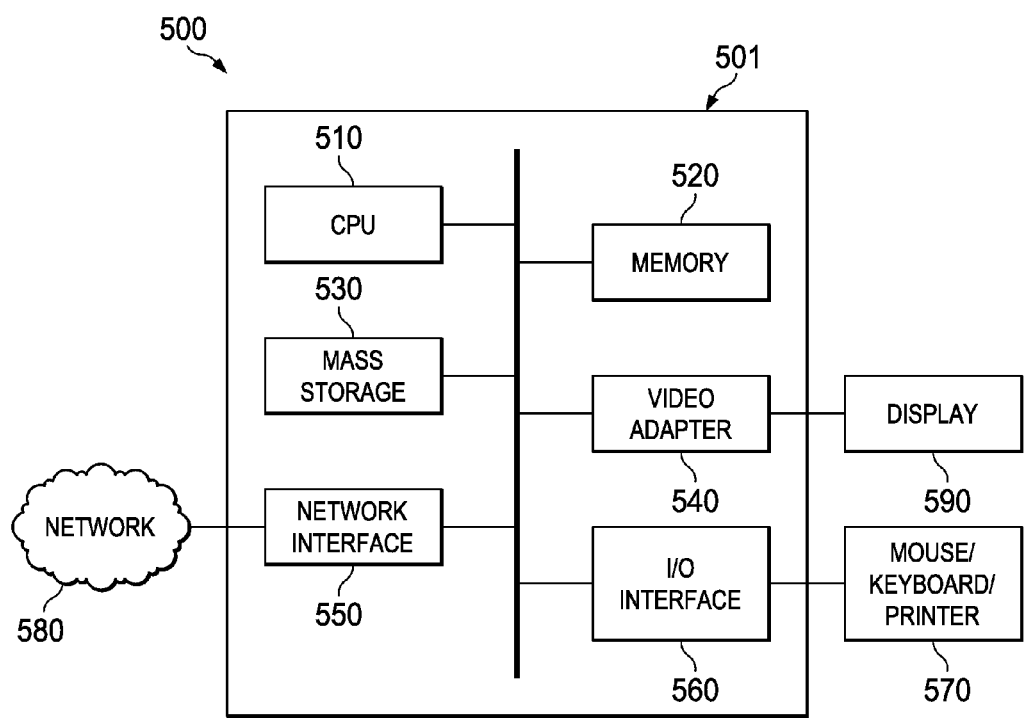
FIG. 5 is a diagram of a processing system that can be used to implement various embodiments.

FIG. 5 is a block diagram of a processing system 500 that can be used to implement various embodiments and algorithms above. For instance the processing system 500 can be part of a STA or UE, such as a smart phone, tablet computer, a laptop, or a desktop computer. The system can also be part of a network entity or component that serves the STA or UE, such as an AP or a base station. The processing system can also be part of a network component, such as a base station. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, a video adapter 540, and an I/O interface 560 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The video adapter 540 and the I/O interface 560 provide interfaces to couple external input and output devices to the processing unit. As illustrated, examples of input and output devices include a display 590 coupled to the video adapter 540 and any combination of mouse/keyboard/printer 570 coupled to the I/O interface 560. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for uplink (UL) orthogonal frequency division-multiple access (OFDMA) transmission, the method comprising:

sending, by an access point (AP) to a plurality of stations (STAs), scheduling information for periodic UL transmission, wherein the scheduling information indicates a time period for periodic short synchronous signal (SSS) transmission and frequency resource information for the periodic SSS transmission;

periodically sending, to the STAs, an SSS to synchronize the STAs after sending the scheduling information, in accordance with the time period and the frequency resource information, wherein a number of orthogonal frequency division-multiple (OFDM) symbols occupied by the SSS is smaller than a number of OFDM symbols occupied by the scheduling information; and receiving, from the STAs, information of a UL transmission.

2. The method of claim 1, wherein the SSS is a signal occupying one or a small number of OFDM symbols sufficient for signaling the STAs.

3. The method of claim 1, wherein the SSS is a signal in a form of a determined designed sequence.

4. The method of claim 1, further comprising:
receiving, from each one of the plurality of the STAs, information of a second-UL transmission in response to a second SSS.

5. The method of claim 1, wherein the information of the UL transmission is received from each one of the plurality of the STAs after at least a time short interframe space (SIFS) from sending the SSS.

6. The method of claim 1, further comprising:
sending, from the AP to a plurality of second STAs, second scheduling information for periodic UL transmission;
sending, to the second STAs, a second SSS in accordance with the second scheduling information; and
receiving, from each one of the plurality of the second STAs, information of a second UL transmission.

7. The method of claim 6, wherein the second SSS is sent to the second STAs at a different timing from sending the SSS to the STAs.

8. The method of claim 1, wherein the SSS is sent to the plurality of STAs on same frequency resource in accordance with the frequency resource information for one of the STAs.

9. The method of claim 1, wherein the SSS is sent to each one of the STAs on a corresponding frequency resource in accordance with the frequency resource information for the each one of the STAs.

10. The method of claim 1, wherein the SSS comprises power control information for controlling transmission power of the UL transmission from the STAs.

11. An access point (AP) supporting uplink (UL) orthogonal frequency division-multiple access (OFDMA) transmission, the AP comprising:
a non-transitory computer readable storage medium storing programming; and
at least one processor coupled to the non-transitory computer readable storage medium, being configured to execute the programming to:
send to a plurality of stations (STAs), scheduling information for periodic UL transmission, wherein the scheduling information indicates a time period for periodic short synchronous signal (SSS) transmission and frequency resource information for the periodic SSS transmission;
periodically send, to the STAs, an SSS to synchronize the STAs after sending the scheduling information, in accordance with the time period and the frequency resource information, wherein a number of orthogonal frequency division-multiple (OFDM) symbols occupied by the SSS is smaller than a number of OFDM symbols occupied by the scheduling information; and
receive, from the STAs, information of a UL transmission.

12. The AP of claim 11, wherein the UL transmission is a WiFi signal.

13. A method for uplink (UL) orthogonal frequency division-multiple access (OFDMA) transmission, the method comprising:
receiving, by a station from an access point (AP), scheduling information for periodic UL transmission, wherein the scheduling information indicates a time period for periodic short synchronous signal (SSS) transmission and frequency resource information for the periodic SSS transmission;
periodically receiving, from the AP, an SSS in accordance with the time period and the frequency resource information after receiving the scheduling information, wherein a number of orthogonal frequency division-multiple (OFDM) symbols occupied by the SSS is smaller than a number of OFDM symbols occupied by the scheduling information;
waiting for a time short interframe space (SIFS); and
sending, to the AP, information of a UL transmission in response to receiving the SSS.

14. The method of claim 13, further comprising:
sending, to the AP, information of a second UL transmission in response to receiving a second SSS.

15. The method of claim 13, wherein the SSS is in a form of a determined designed sequence.

16. The method of claim 13, wherein the SSS comprises power control information, and wherein the information of the UL transmission is sent by the STA in accordance with the power control information.

17. A station (STA) supporting uplink (UL) orthogonal frequency division-multiple access (OFDMA) transmission, the STA comprising:
a non-transitory computer readable storage medium storing programming; and
at least one processor coupled to the non-transitory computer readable storage medium, being configured to execute the programming to:
receive, from an access point (AP), scheduling information for periodic UL transmission, wherein the scheduling information indicates a time period for periodic short synchronous signal (SSS) transmission and frequency resource information for the periodic SSS transmission;
periodically receive, from the AP, an SSS in accordance with the time period and the frequency resource information after receiving the scheduling information, wherein a number of orthogonal frequency division-multiple (OFDM) symbols occupied by the SSS is smaller than a number of OFDM symbols occupied by the scheduling information;
wait for a time short interframe space (SIFS); and
send, to the AP, information of a UL transmission in response to receiving the SSS.

18. The station of claim 17, wherein the SSS is a signal occupying one or a small number of OFDM symbols sufficient for signaling the STA.

19. The station of claim 17, wherein the at least one processor being configured to execute the programming to:
send information of a second UL transmission in response to receiving a second SSS.

20. The station of claim 17, wherein the information of the UL transmission is sent by the STA in accordance with the power control information.

* * * * *